(12) United States Patent
Girondi

(10) Patent No.: US 11,339,692 B2
(45) Date of Patent: May 24, 2022

(54) ENGINE OIL FILTRATION AND TEMPERATURE REGULATION ASSEMBLY

(71) Applicant: UFI FILTERS S.P.A., Mantova (IT)

(72) Inventor: Giorgio Girondi, Mantova (IT)

(73) Assignee: UFI FILTERS S.P.A., Mantova (IT)

( * ) Notice: Subject to any disclaimer, the term of this patent is extended or adjusted under 35 U.S.C. 154(b) by 270 days.

(21) Appl. No.: 16/461,304

(22) PCT Filed: Nov. 14, 2017

(86) PCT No.: PCT/IB2017/057096
§ 371 (c)(1),
(2) Date: May 15, 2019

(87) PCT Pub. No.: WO2018/092019
PCT Pub. Date: May 24, 2018

(65) Prior Publication Data
US 2019/0316499 A1    Oct. 17, 2019

(30) Foreign Application Priority Data
Nov. 16, 2016    (IT) .......................... 102016000115641

(51) Int. Cl.
*F01M 11/03*     (2006.01)
*F01M 5/00*      (2006.01)
(Continued)

(52) U.S. Cl.
CPC ............ *F01M 5/002* (2013.01); *F01M 11/03* (2013.01); *F28D 9/005* (2013.01);
(Continued)

(58) Field of Classification Search
CPC .. F01M 5/002; F01M 11/03; F01M 2011/033; F28D 9/005; F28D 2021/0049; F28D 2021/0089
(Continued)

(56) References Cited

U.S. PATENT DOCUMENTS 1,900,821 A * 3/1933 Kline ..................... F01M 11/03
                                                          210/133
3,762,467 A * 10/1973 Poon ......................... F28D 9/04
                                                          165/163
(Continued)

FOREIGN PATENT DOCUMENTS

DE    10 2007 052 706 A1    5/2009
DE    10 2009 022 919 A1   12/2010
(Continued)

OTHER PUBLICATIONS

International Search Report and Written Opinion of the International Searching Authority for International Patent Application No. PCT/IB2017/057096 dated Mar. 2, 2018, 10 pages.

*Primary Examiner* — Hung Q Nguyen
*Assistant Examiner* — Anthony Donald Taylor, Jr.
(74) *Attorney, Agent, or Firm* — Merchant & Gould P.C.

(57) ABSTRACT

An engine oil filtration and temperature regulation assembly (1) mountable on a vehicle engine fluidically connectable to an engine oil circulation system (1). The assembly includes an oil filtration group (2), a heat exchanger group (3) and a support and fluidic connection group (5) to engage to the engine and to support the filtration group (2) and the heat exchanger group (3). The group (5) includes a base plate (50) fluidically connected to receive and return oil from and to the engine. The group (5) includes a support and fluidic connection device (500), between the base plate (50) and the filtration group (2) and/or heat exchanger group (3) having a multi-layer assembly (510) having plate-shaped elements (5101, 5102, 5103, 5104, 5105, 5106) overlappable to constitute respective ducts to create a fluidic connection between the engine and oil filtration group (2) and/or heat exchanger group (3).

18 Claims, 13 Drawing Sheets

(51) Int. Cl.
*F28D 9/00* (2006.01)
*F28D 21/00* (2006.01)

(52) U.S. Cl.
CPC .............. *F01M 2011/033* (2013.01); *F28D 2021/0049* (2013.01); *F28D 2021/0089* (2013.01)

(58) Field of Classification Search
USPC ........................................................ 123/196
See application file for complete search history.

(56) References Cited

U.S. PATENT DOCUMENTS

| | | | | | |
|---|---|---|---|---|---|
| 4,360,055 | A * | 11/1982 | Frost | ............ | F28D 9/0012 165/167 |
| 4,426,965 | A * | 1/1984 | Patel | ............ | F01P 11/08 123/196 AB |
| 4,638,856 | A * | 1/1987 | Yamanaka | ............ | B01D 27/14 165/119 |
| 4,923,603 | A * | 5/1990 | Maykulsky | ............ | B01D 35/30 210/167.06 |
| 5,014,775 | A * | 5/1991 | Watanabe | ............ | B01D 35/306 165/167 |
| 5,078,209 | A * | 1/1992 | Kerkman | ............ | F28D 9/0012 165/167 |
| 5,326,461 | A * | 7/1994 | Legrand | ............ | B01D 35/18 210/186 |
| 5,476,139 | A * | 12/1995 | Gire | ............ | F01M 11/03 165/119 |
| 5,575,329 | A * | 11/1996 | So | ............ | F28F 9/0217 165/167 |
| 5,758,908 | A * | 6/1998 | Haasch | ............ | F28F 9/0246 285/192 |
| 5,967,111 | A * | 10/1999 | Hedman | ............ | B01D 29/21 123/196 A |
| 6,206,090 | B1 * | 3/2001 | Rago | ............ | B01D 29/54 165/119 |
| 6,263,960 | B1 * | 7/2001 | Yamanaka | ............ | F01M 11/03 123/196 AB |
| 6,263,962 | B1 * | 7/2001 | Komoda | ............ | B01D 27/005 165/167 |
| 6,427,768 | B2 * | 8/2002 | Komoda | ............ | B23K 1/0012 165/145 |
| 6,863,122 | B2 * | 3/2005 | St. Pierre | ............ | F28D 9/0043 165/167 |
| 7,318,451 | B2 * | 1/2008 | Peric | ............ | F16K 15/144 137/855 |
| 8,186,328 | B2 * | 5/2012 | Kiemlen | ............ | F01M 5/002 123/196 AB |
| 8,635,984 | B2 * | 1/2014 | Ardes | ............ | F01M 11/03 123/196 A |
| 8,887,688 | B1 * | 11/2014 | Neal | ............ | F01M 5/00 123/196 R |
| 2007/0175434 | A1 * | 8/2007 | Gruner | ............ | F01M 11/03 123/196 A |
| 2010/0116465 | A1 * | 5/2010 | Jainek | ............ | F28F 27/02 165/103 |
| 2012/0061060 | A1 * | 3/2012 | Stoll | ............ | F28F 9/0246 165/133 |
| 2013/0153475 | A1 * | 6/2013 | Jainek | ............ | F01M 11/03 210/149 |
| 2013/0180496 | A1 * | 7/2013 | Murphy | ............ | F28D 9/005 123/196 A |

FOREIGN PATENT DOCUMENTS

| | | | | |
|---|---|---|---|---|
| DE | 102009022919 A1 * | 12/2010 | ............ | F01M 5/002 |
| DE | 10 2009 034 752 A1 | 2/2011 | | |
| DE | 10 2010 034 788 A1 | 2/2012 | | |
| EP | 1493903 A1 * | 1/2005 | ............ | B01D 35/18 |
| EP | 1 876 406 A1 | 1/2008 | | |
| EP | 1876406 A1 * | 1/2008 | ............ | B01D 35/306 |
| EP | 2 466 241 A1 | 6/2012 | | |
| FR | 2 871 516 A1 | 12/2005 | | |
| FR | 2871516 A1 * | 12/2005 | ............ | F01M 11/03 |
| WO | 2012/061928 A1 | 5/2012 | | |

\* cited by examiner

ENGINE OIL FILTRATION AND TEMPERATURE REGULATION ASSEMBLY

This application is a National Stage Application of PCT/IB2017/057096, filed 14 Nov. 2017, which claims benefit of Serial No. 10/2016000115641, filed 16 Nov. 2016 in Italy and which applications are incorporated herein by reference. To the extent appropriate, a claim of priority is made to each of the above-disclosed applications.

FIELD OF APPLICATION

The present invention relates to an engine oil filtration and temperature regulation assembly. Furthermore, the present invention relates to a production method of an engine oil filtration and temperature regulation assembly.

In other words, the present invention relates to an assembly mountable on an engine, preferably of the internal combustion type, fluidically connectable to the engine oil circulation system and, optionally, also fluidically connectable to the engine water circulation system, wherein by water it is meant a generic cooling liquid for example comprising glycol.

PRIOR ART

In the prior art, solutions of engine oil filtration and temperature regulation assembly are known, suitable, depending to needs, to make filtration operation of a predetermined amount of oil as well as temperature regulation operation of a predetermined amount of oil.

In other words, assemblies are known comprising a filtration group through which the engine oil is filtered before being returned to the engine and comprising a heat exchanger group through which, if required, the oil temperature is regulated, for example lowering it.

The known solutions of filtration and temperature regulation assemblies have, as a whole, particularly complex geometries and layouts.

Specifically, it is in fact particularly complex to find the space in the engine compartment of a vehicle to house all the components of an oil filtration and temperature regulation assembly.

In light of this, a typical problem of such products is that of having complex fastening modes of the engine oil filtration and temperature regulation assembly, both of the assembly in its entirety and of the various constituting components. Likewise, the layout of the various ducts through which oil and optionally water, respectively, flow, is also particularly complex.

For such reasons, the known filtration and regulation assemblies are produced and designed ad hoc, as a function of the vehicle layout, and therefore as a function of the spaces which in the engine compartment are occupied by the assembly and in particular by the components thereof.

Typically, in fact, the known solutions of filtration and regulation assemblies have support and fluidic connection groups suitable to support and put the engine in fluidic connection with the oil filtration group and with the heat exchanger group; such groups have particularly complex geometries. For example embodiments are known in which such support and connection groups are obtained in a single plastic component, through moulding operations.

An example of embodiment of a filtration and regulation assembly having such a problem is shown in document WO2012/061928.

Solution of the Invention

Therefore, the need to provide an engine oil filtration and temperature regulation assembly which comprises an oil filtration group and a heat exchanger group supported and fluidically connected by a support and fluidic connection group of simple construction and great versatility and flexibility is strongly felt.

The object of the present invention is to provide an engine oil filtration and temperature regulation assembly suitable to allow a simple, effective and optimised connection of the oil filtration group and of the heat exchanger group to the engine.

DESCRIPTION OF THE FIGURES

Further features and advantages of the invention shall be made apparent from the following description of preferred embodiments thereof, provided purely by way of a non limiting example, with reference to the accompanying figures, in which.

DETAILED DESCRIPTION

Figure 1A:
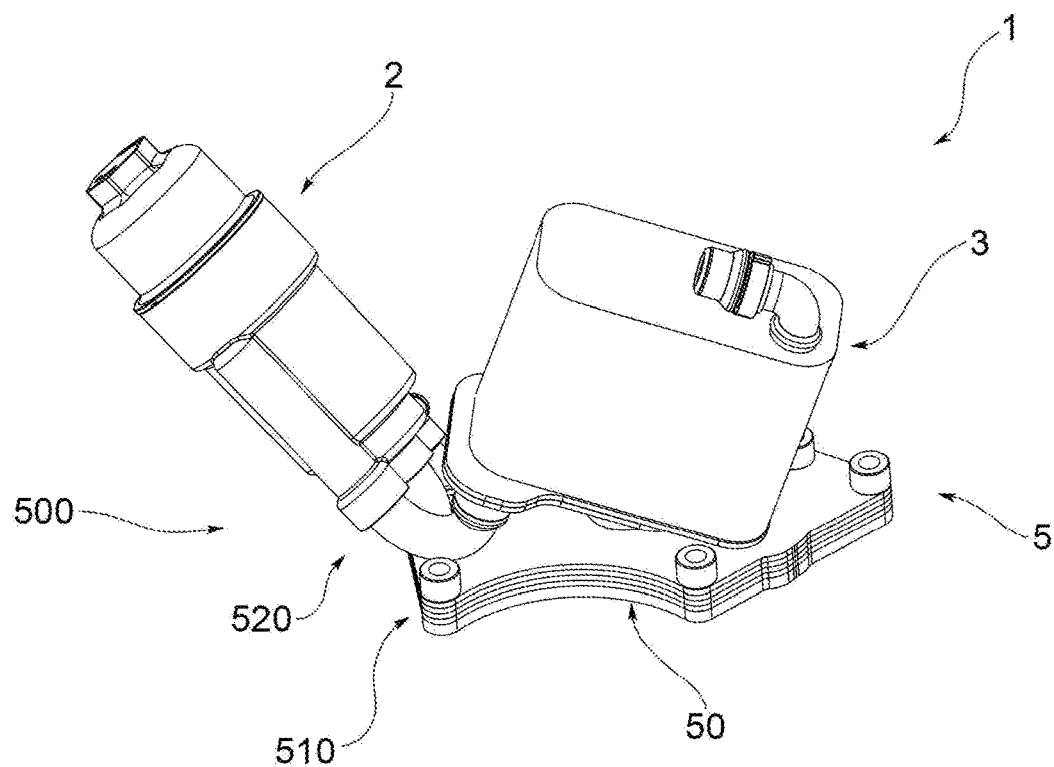
FIGS. 1a and 1b show two perspective views of the engine oil filtration and temperature regulation assembly object of the present invention according to a first preferred embodiment.
Figure 1B:
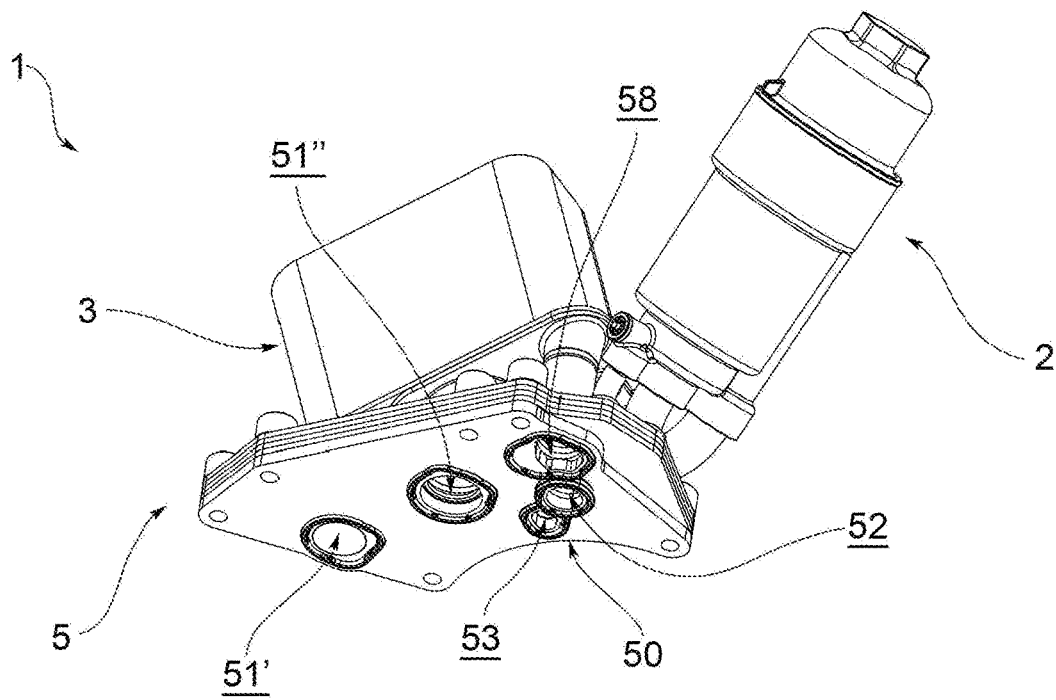
Figure 2:
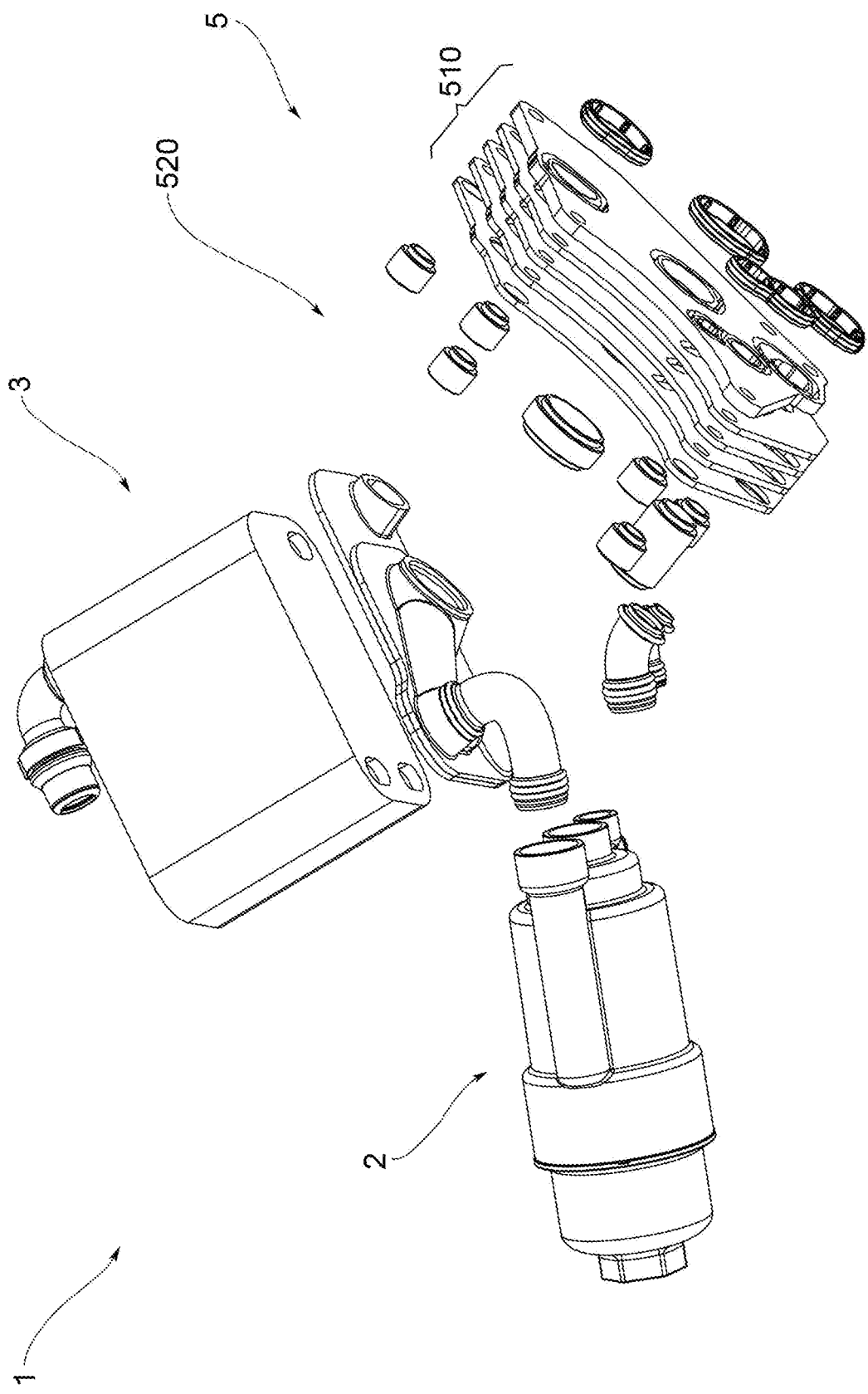
FIG. 2 shows a perspective view of separate parts of the engine oil filtration and temperature regulation assembly of FIGS. 1a and 2b.

With reference to the accompanying figures, reference numeral 1 indicates an engine oil filtration and temperature regulation assembly according to the present invention.

In particular, the filtration and regulation assembly object of the present invention, as fully described below, is mountable on an engine of a vehicle fluidically connectable to an engine oil circulation system. Preferably, the filtration and regulation assembly object of the present invention is also fluidically connectable to an engine water circulation system.

Preferably, the engine in question is of the internal combustion type. However, the object of the present invention is not limited to particular engine embodiments.

The assembly object of the present invention comprises an oil filtration group 2. Preferably, the oil filtration group 2 is suitable to receive a predetermined amount of oil from the engine, is suitable to filter and therefore clean it from any impurities, and is suitable to allow the delivery of filtered oil to the engine.

Specifically, the object of the present invention is not limited to particular embodiments of the oil filtration group 2.

In addition, the assembly comprises a heat exchanger group 3. Preferably, the heat exchanger group 3 is suitable to allow, as a function of the needs, an engine oil temperature regulation. For example, as described below, the assembly 1 has special conducts suitable to allow the passage of oil and water from the engine towards the heat exchanger 3, or to allow the passage of oil directly to the filtration group 2 bypassing the exchanger group 3.

In fact, in the exchanger group 3 oil ducts and water ducts are present in which engine oil and water, respectively, flow. The heat exchanger group 3 is therefore of indirect contact type and therein has the oil channels and the water channels, respectively separate.

With the exceptions of the specific features of the oil filtration group 2 and of the heat exchanger group 3 described below, the present invention is not limited by further and particular embodiments of the oil filtration group 2 and of the heat exchanger group 3.

In order to allow the engagement to the engine and the fluidic connection of various components comprised therein, the engine oil filtration and temperature regulation assembly comprises a support and fluidic connection group 5 suitable to be engaged to the engine. In other words, the support and fluidic connection group 5 is suitable to be directly fixed to the engine.

In addition, the support and fluidic connection group 5 supports the filtration group 2 and the heat exchanger group 3.

In other words, the support and fluidic connection group 5 preferably has the dual function of integrally supporting the filtration group 2 and the heat exchanger group 3 to the engine and of fluidically connecting both the filtration group 2 and the heat exchanger group 3 to the engine.

According to a preferred embodiment, the support and fluidic connection group 5 is suitable to be directly fluidically connected to the engine oil system. According to further preferred embodiments, as those shown in the accompanying figures, the support and fluidic connection group 5 is also suitable to be directly fluidically connected to the engine water system.

In further embodiments, not shown in the accompanying figures but in turn object of the present invention, the heat exchanger group 3 is suitable to be fluidically connected to the engine water system by special external connectors to the support and fluidic connection group 5.

The support and fluidic connection group 5 comprises a base plate 50 and a support and fluidic connection device 500.

Specifically, the base plate 50 is suitable to interface in a direct manner with the engine directly engaging it.

Said base plate 50 comprises at least one oil inlet mouth 51 suitable to be fluidically connected to receive oil from the engine and at least one oil outlet mouth 52 suitable to be fluidically connected to return filtered oil to the engine. In other words, the base plate 50 is suitable to be the first component of the engine oil filtration and temperature regulation assembly 1 fluidically connected to the engine by said mouths.

According to a preferred embodiment, the base plate 50 further comprises at least one water inlet mouth 58 suitable to be fluidically connected to receive water (cooling liquid) from the engine.

Said support and fluidic connection device 500 is placed between the base plate 50 and heat exchanger group 3 and/or filtration group 2. That is to say, the support and fluidic connection device 500 is suitable to create a fluidic connection between the base plate 50 and heat exchanger group 3 and/or filtration group 2.

According to a preferred embodiment, the support and fluidic connection device 500 comprises a multi-layer assembly 510 comprising a plurality of overlappable plate-shaped elements 5101, 5102, 5103, 5104, 5105, 5106.

In other words, the multi-layer assembly 510 is suitable to comprise a plurality of sandwich packaged layers.

That is to say, each plate-shaped element 5101, 5102, 5103, 5104, 5105, 5106, has a substantially planar extension and has respective packing surfaces on the two opposite sides. Preferably, the plate-shaped elements 5101, 5102, 5103, 5104, 5105, 5106 are overlappable facing the respective packing surfaces of two consecutive plate-shaped elements.

Furthermore, each plate-shaped element 5101, 5102, 5103, 5104, 5105, 5106 has a plurality of openings each defined by a respective opening edge, in such a way that said openings are overlappable and constitute respective ducts 5100, 5200, 5800 suitable to create a fluidic connection between engine and oil filtration group 2 and/or heat exchanger group 3.

In other words, each plate-shaped element 5101, 5102, 5103, 5104, 5105, 5106 has through openings specifically shaped to create specific ducts in the plate-shaped elements through the packing operation.

In a preferred embodiment, each plate-shaped element 5101, 5102, 5103, 5104, 5105, 5106 has openings delimited by special edges to define the walls of corresponding ducts with the plurality of plate-shaped elements arranged in a packing configuration.

Specifically, for each opening, described above on the base plate 50, on one or more, or optionally on all, the plate-shaped elements 5101, 5102, 5103, 5104, 5105, 5106 there are special openings.

According to a preferred embodiment, the overlappable openings respectively formed on each plate-shaped element 5101, 5102, 5103, 5104, 5105, 5106 are defined by edges having shapes different from each other.

According to a preferred embodiment, the openings are arranged on the respective plate-shaped element 5101, 5102, 5103, 5104, 5105, 5106 in such a way that they are overlappable, but they are not coincident.

In other words, each opening has a predetermined shape in order to create a special duct to allow the connection between the inlet and outlet mouths present on the base plate 50 and the oil filtration group 2 and the heat exchanger group 3.

In a preferred embodiment, as a function of the arrangement of each opening, the respective ducts have development in height. Preferably, the respective ducts have a main direction of development parallel to the packing direction of the plate-shaped elements.

According to a further preferred embodiment, as a function of the arrangement of each opening, the respective ducts have horizontal development. Preferably, the respective ducts have a main direction of development inclined to the packing direction of the plate-shaped elements.

According to further preferred embodiments, the respective ducts have a mixed main direction of development, providing a development both in height and horizontal.

According to a preferred embodiment, starting from the inlet mouth 51 an oil inlet duct 5100 is arranged in the multi-layer assembly 510.

According to a preferred embodiment, the base plate 50 comprises a first oil inlet mouth 51' and the support and fluidic connection device 500 comprises a first oil connection duct 5100' wherein the oil flows towards the exchanger group 3 and comprises a second oil inlet mouth 51" and the support and fluidic connection device 500, comprises a second oil connection duct 5100" wherein the oil flows towards the filtration group 2 bypassing the exchanger group 3. As an example, such preferred embodiment is that shown in the embodiment of figures from 1 to 4.

According to a preferred embodiment, the base plate 50 comprises a first oil inlet mouth 51 and the support and fluidic connection device 500 comprises a first oil duct 5100' formed on the packing of the plate-shaped elements wherein the oil flows towards the exchanger group 3 (or towards the filtration group 2) and a second oil connection duct 5100" wherein the oil flows towards the filtration group 2 (or the exchanger group 3) bypassing the exchanger group 3 (or the filtration group 2). As an example, such a preferred embodiment is that shown in the embodiment of figures from 5 to 7.

Likewise, starting from the oil outlet mouth 52 an oil outlet duct 5200 is arranged in the multi-layer assembly 510.

Furthermore, starting from the water inlet mouth 58 a water inlet duct 5800 is arranged in the multi-layer assembly 510.

According to a preferred embodiment, the base plate 50 also comprises an oil drainage outlet mouth 53 through which, from the exchanger group 3 and/or from the filtration group 2 to the engine, oil is drained through a respective drainage duct 5300 identified in the multi-layer assembly 510.

As a function of the preferred embodiments, described below and with reference to the accompanying figures, at each mouth, respective first plate openings 511, 511', 511", 521, 531, 581, respective second plate openings 512, 512', 512", 522, 532, 582, respective third plate openings 513, 513', 513", 523, 533, 583, respective fourth plate openings 514, 514', 514", 524, 534, 584, respective fifth plate openings 515, 515', 515", 525, 535, 585, respective sixth plate openings 516, 516', 516", 526, 536, 586 are identified. In other words, depending on the number of plates is a respective number of openings.

According to a preferred embodiment, the base plate 50 has a central portion 501 in which the at least one oil inlet mouth 51, the at least one oil outlet mouth 52 and the possible at least one water inlet mouth 58 and at least one drainage oil outlet mouth 53 are formed.

Preferably, therefore, at the sides of the central portion 501, the control plate 50 comprises at least one fixing portion 505 through which the support and fluidic connection group 5 is fixable to the engine, for example by means of screws through specially shaped mounting holes. Adjacent to the central portion 501, therefore, the base plate 50 comprises at least one, preferably more than one, fixing portions 505 specially designed to allow the fixing of the base plate 50 to the engine.

Preferably, through the fixing portions 505, the base plate 50 can be screwed, for example by screws to the engine.

Preferably, the base plate 50 in the central portion 501 thereof is free from the presence of screws or other fixing means.

According to a preferred embodiment, the exchanger group 3 has a vertical development.

For example, a preferred embodiment with an exchanger group 3 with vertical development is shown in FIGS. 1 to 4.

For example, in such a preferred embodiment, the exchanger group 3 has sectional dimensions smaller than those of the base plate 50.

According to a preferred embodiment, the multi-layer assembly 510 has a shape substantially equal to the shape of the base plate 50 comprising a plurality of plate-shaped elements 511, 512, 513, 514 having the same shape as the base plate 50.

According to a preferred embodiment, the support and fluidic connection device 500 also comprises an auxiliary assembly 520 placed between the multi-layer assembly 510 and the exchanger group 3 to mutually connect them fluidically and identify a filter connection region in which a portion of the filtration group 2 is housed.

Preferably, depending on the mutual arrangement between the oil filtration group 2 and the heat exchanger group 3, a filter connection region is formed by means of the auxiliary assembly 520, housed between multi-layer assembly 510 and heat exchanger group 3, in which a connection sleeve of the oil filtration group 2 may be accommodated to connect to the multi-layer assembly 510.

According to a preferred embodiment, said auxiliary assembly 520 comprises spacer elements 5201', 5201" operatively connected with the multi-layer assembly 510 and auxiliary plate-shaped elements 5202', 5202", overlapping and operatively connected with the heat exchanger group 3 and/or with the filtration group 2 and with said spacer elements 5201', 5201"; preferably, possibly said auxiliary plate-shaped elements 5202', 5202" are also suitable to be operatively connected also with the multi-layer assembly 510.

According to a preferred embodiment, said spacer elements 5201', 5201" have a substantially tubular shape and preferably extend linearly in height.

Preferably, also the spacer elements 5201', 5201" and the auxiliary plate-shaped elements 5202', 5202" comprise a plurality of openings each defined by a respective opening edge, in such a way that said openings are overlappable and constitute in the mutual coupling auxiliary ducts 5102', 5102", 5802" fluidically connected to the above ducts of the multi-layer assembly 510 for the fluidic connection between multi-layer assembly 510 and exchanger group 3 and/or filtration group 2.

In other words, preferably, through the mutual coupling between the various elements of the multi-layer assembly 510 and of the auxiliary assembly 520, the heat exchanger 3, distanced from the multi-layer assembly is still fluidically connected to the engine.

According to a preferred embodiment, by means of the auxiliary assembly 520, the heat exchanger group 3 is disposed in a position spaced and inclined with respect to the base plate 50 and to the multi-layer assembly 510.

Preferably, therefore, depending on the angle of inclination of the heat exchanger group 3, this has increased size of the plates that make it up (and ducts obtained therein) with respect to a position thereof parallel to the multi-layer assembly 510.

According to this embodiment, the engine oil filtration and temperature regulation assembly 1 is suitable to occupy in vertical the space in the engine compartment, proposing an efficient and more powerful heat exchanger group 3.

Figure 3A:
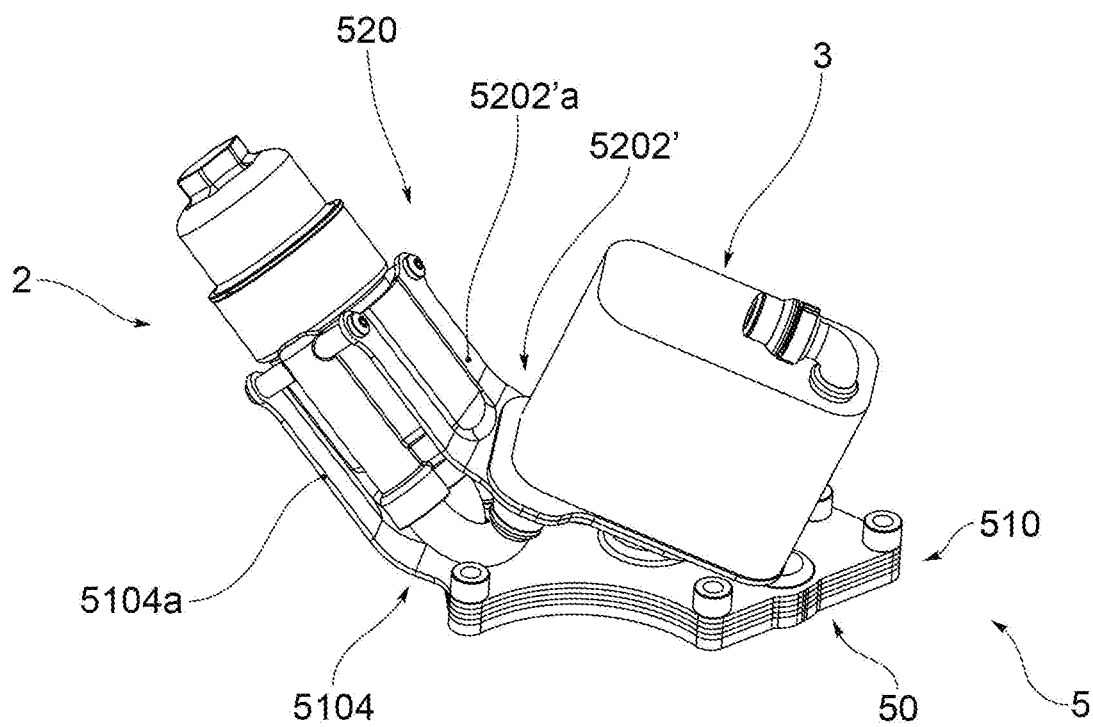
FIGS. 3a and 3b show two perspective views of the engine oil filtration and temperature regulation assembly object of the present invention according to the first preferred embodiment shown in FIGS. 1a and 1b, according to an embodiment variant.
Figure 3B:
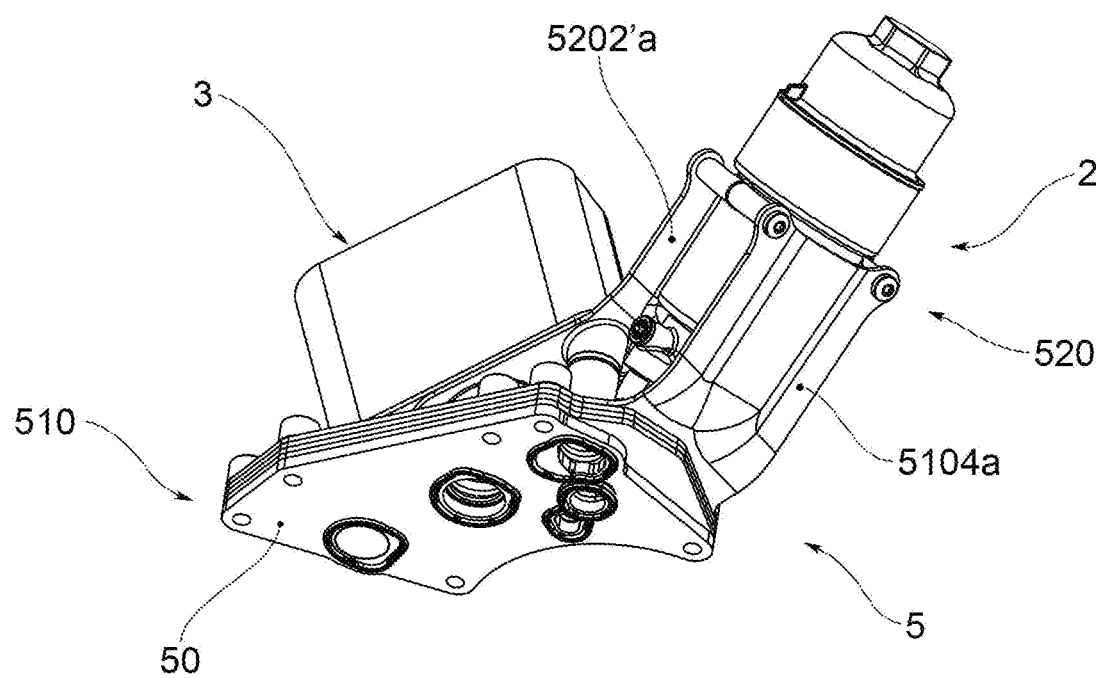
Figure 4A:
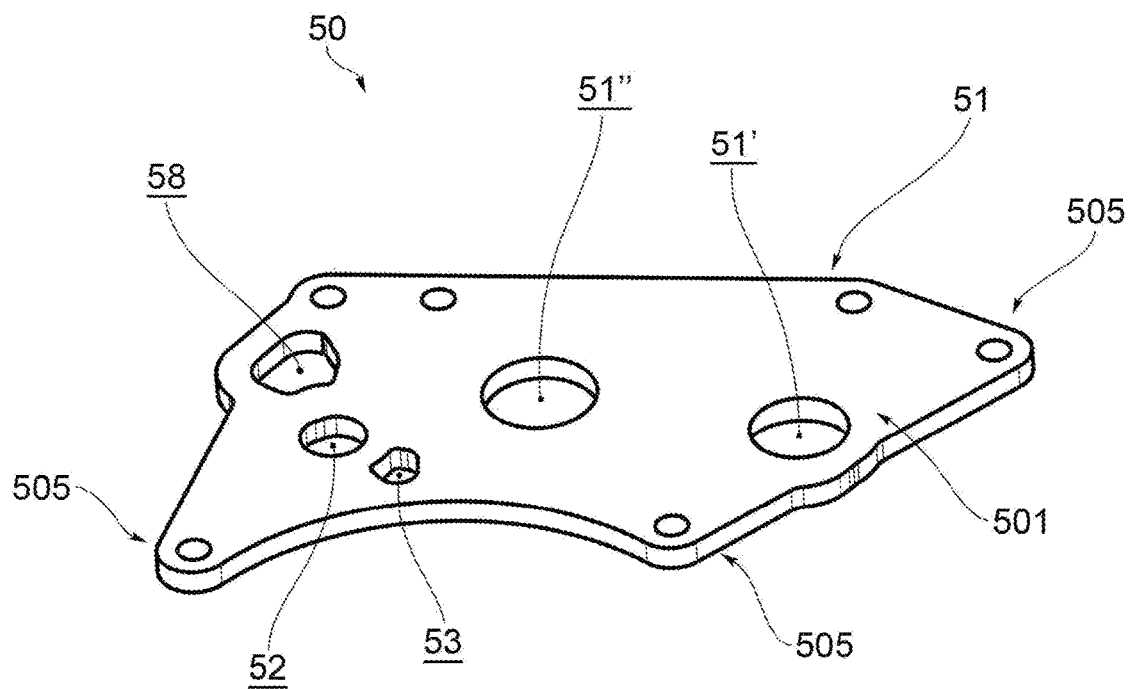
FIGS. 4a to 4h show some preferred assembly steps of a support and fluidic connection group comprised in the assembly of FIGS. 1a and 1b.
Figure 4B:
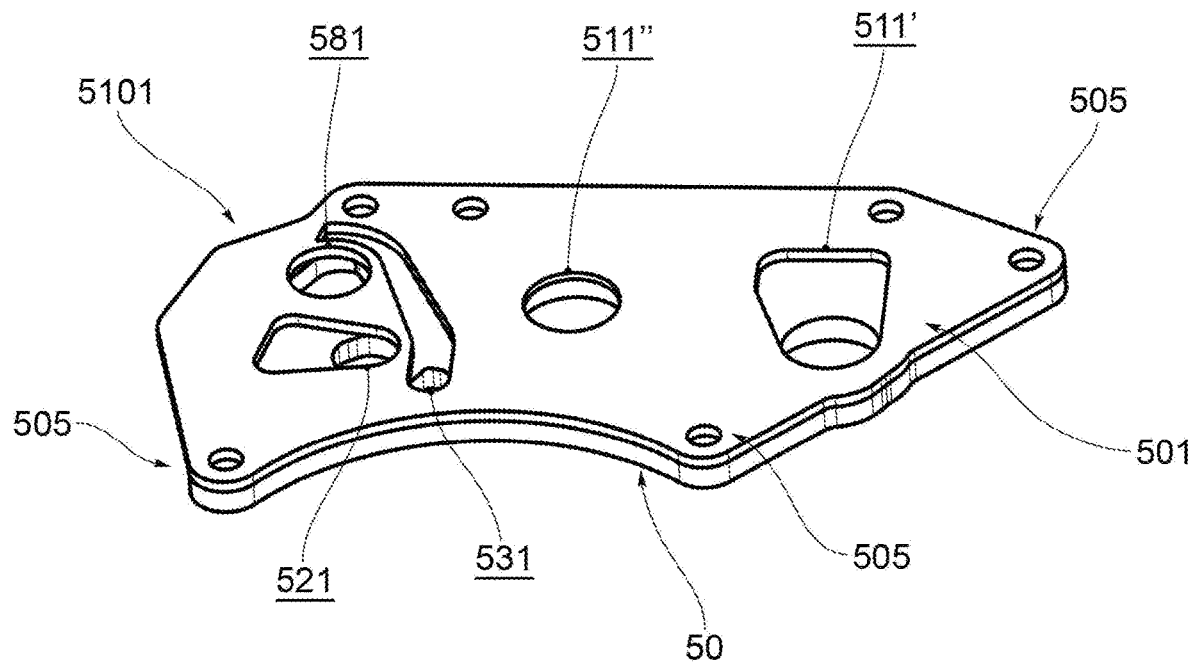
Figure 4C:
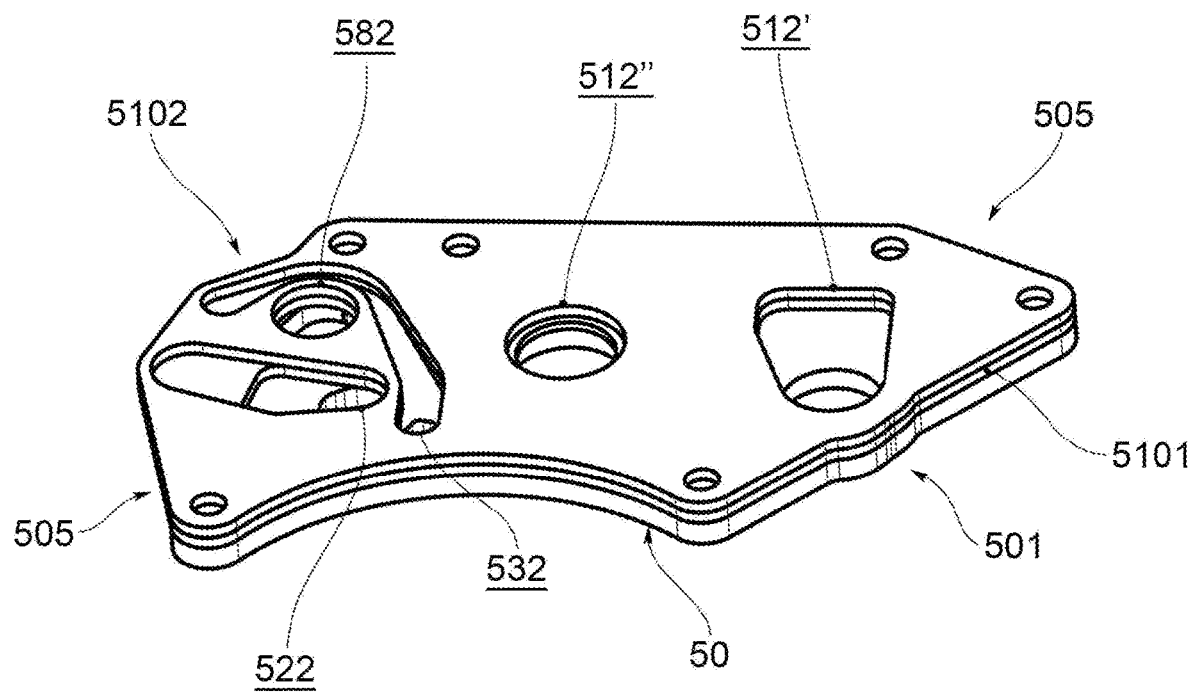
Figure 4D:
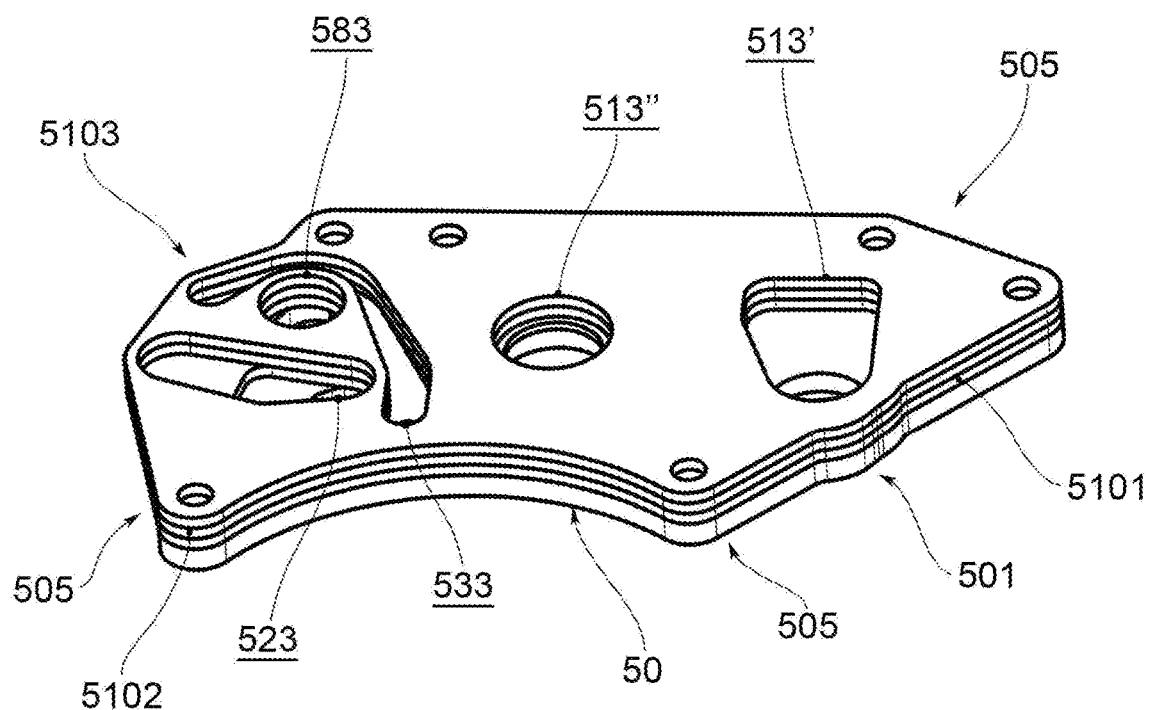
Figure 4E:
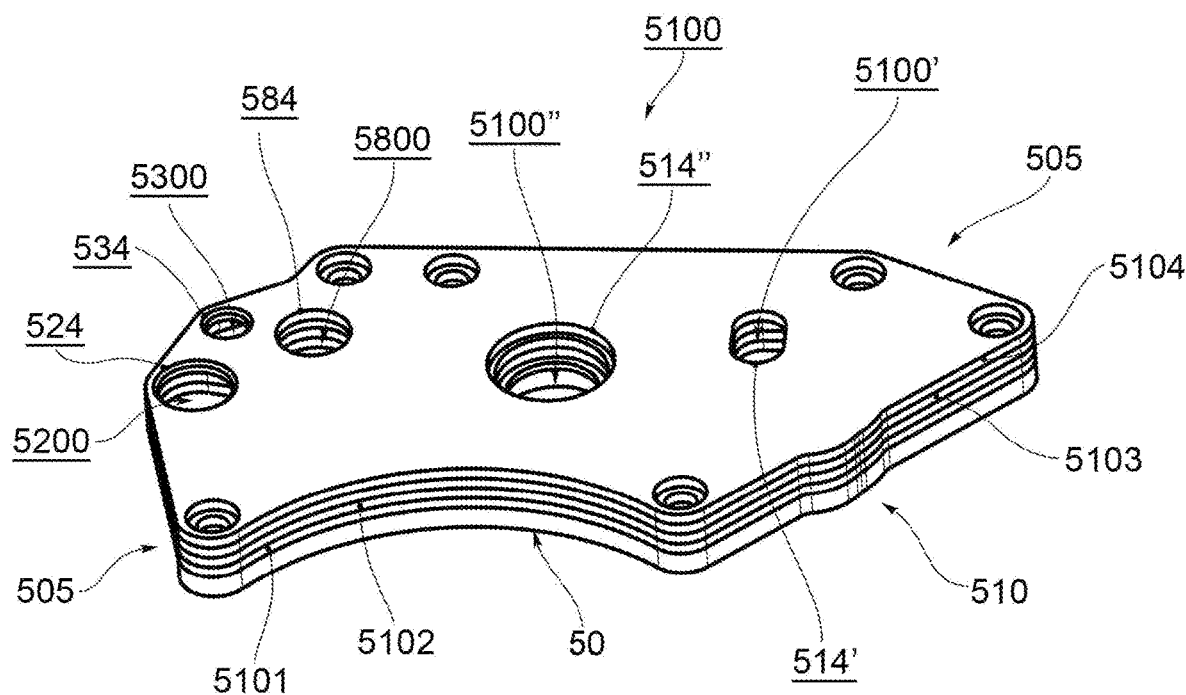
Figure 4F:
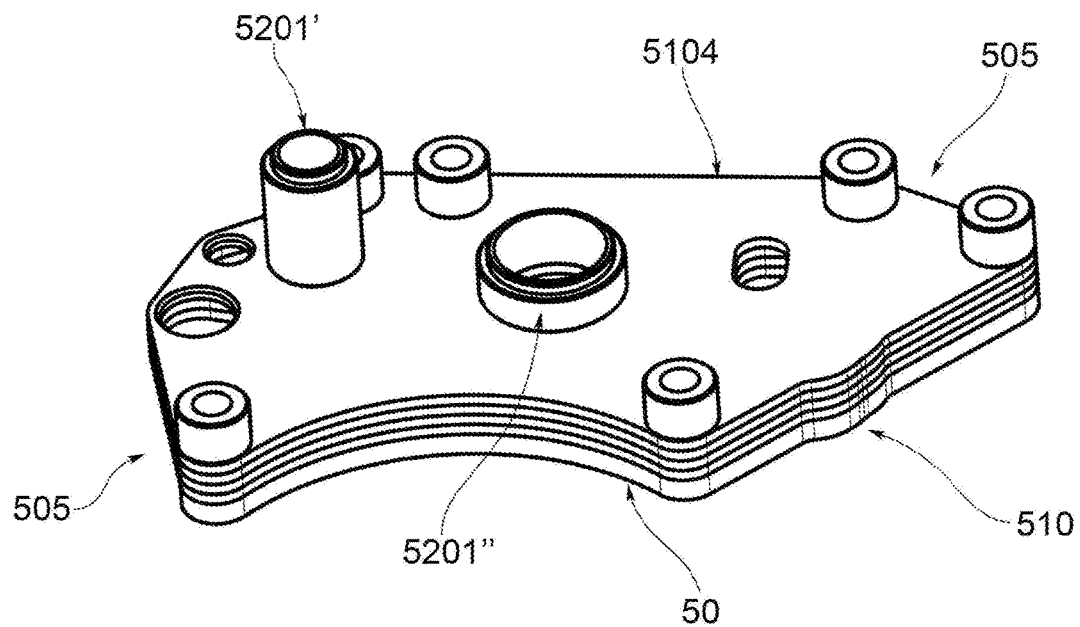
Figure 4G:
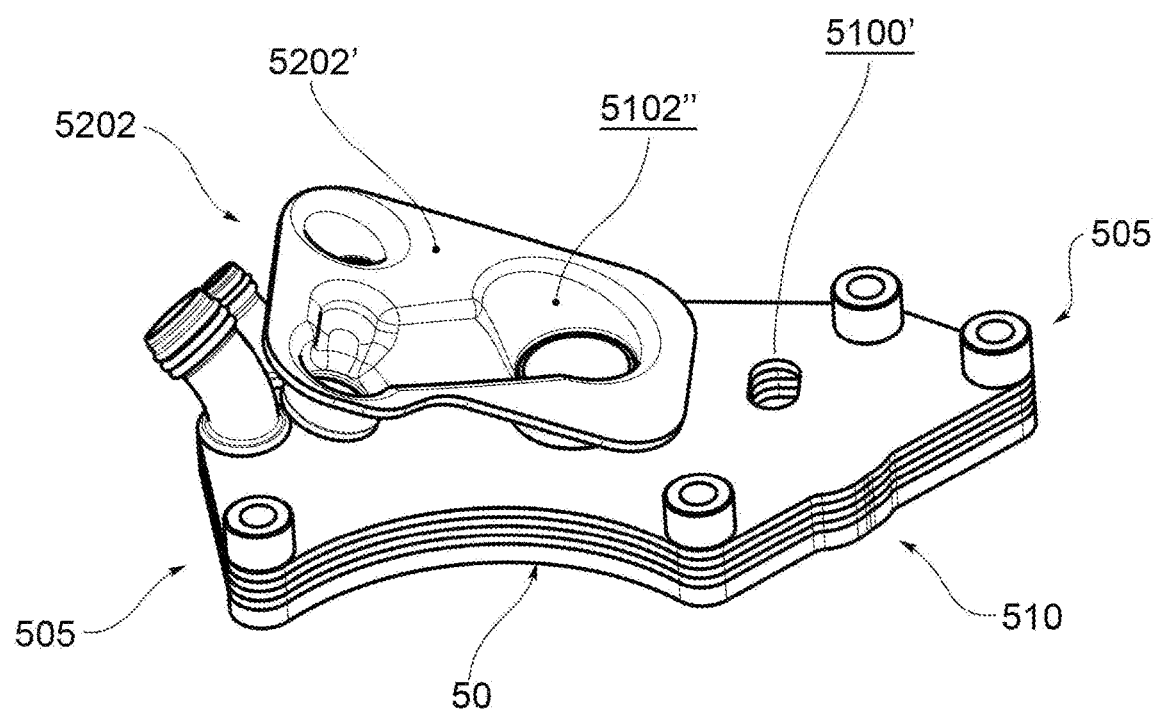
Figure 4H:
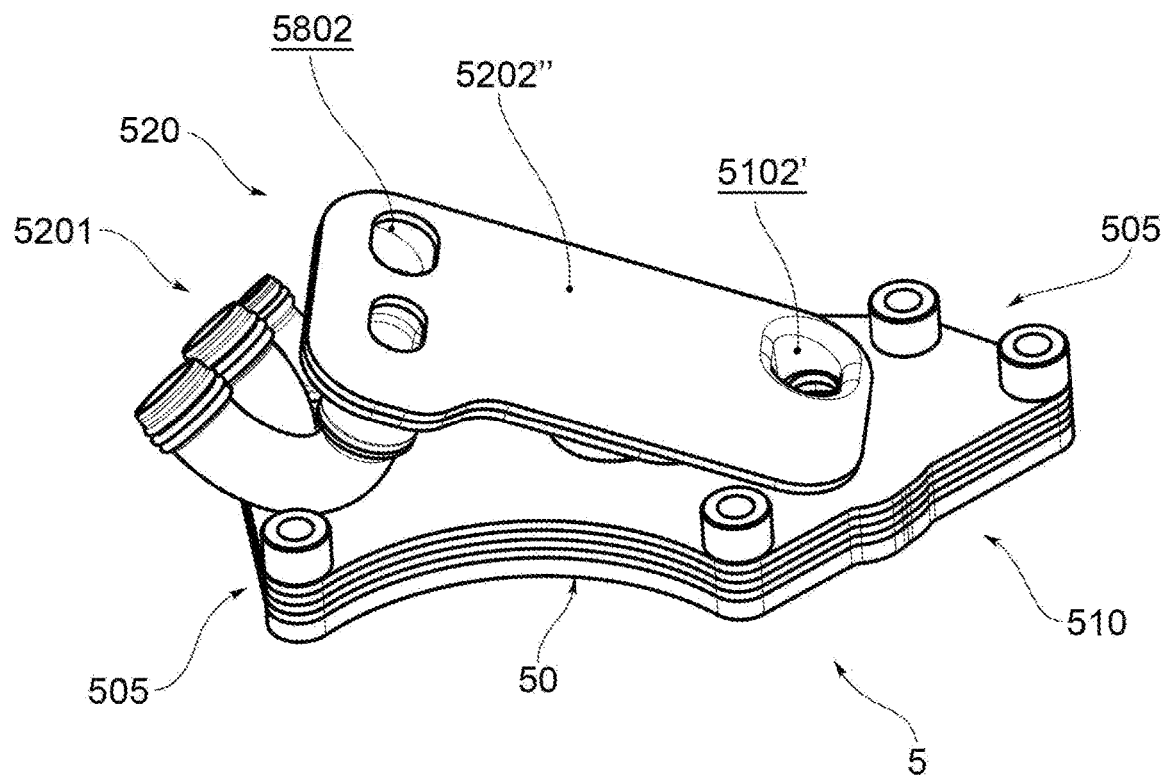

According to an embodiment variant of such an embodiment, in which the fluidic connection and support group 500 comprises a multi-layer assembly 510 and an auxiliary assembly 520, as that shown by way of example in FIGS. 3a and 3b, some plate-shaped elements are of the flanged type. In other words, both the multi-layer assembly 510 and the auxiliary assembly 520 comprise at least one flanged plate-shaped element 5104a, 5202a', respectively, extending with respect to the shapes of the base plate 50 and/or of the heat exchanger group 3, in such a way as to allow a solid support to the filtration group. Preferably and advantageously, therefore, the filtration group 2, albeit in an overhanging position, is integrally supported by said flanged plate-shaped elements. Preferably, in such an embodiment, the oil filtration group 2 is enclosed sandwiched between two flanged plate-shaped elements, however possible embodiments may be contemplated in which only one flanged plate-shaped element is provided.

According to the preferred embodiment, moreover, the heat exchanger group 3 has a horizontal development, and has sectional dimensions larger than those of the base plate 50.

Figure 5A:
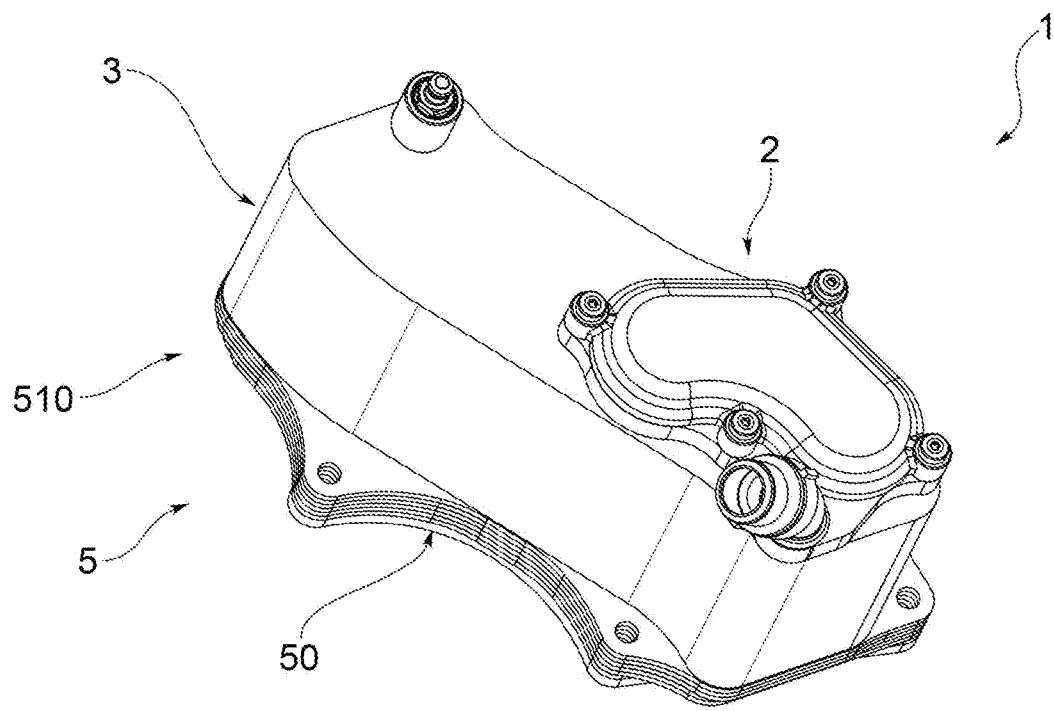
FIGS. 5a and 5b show two perspective views of the engine oil filtration and temperature regulation assembly object of the present invention according to a second preferred embodiment.
Figure 5B:
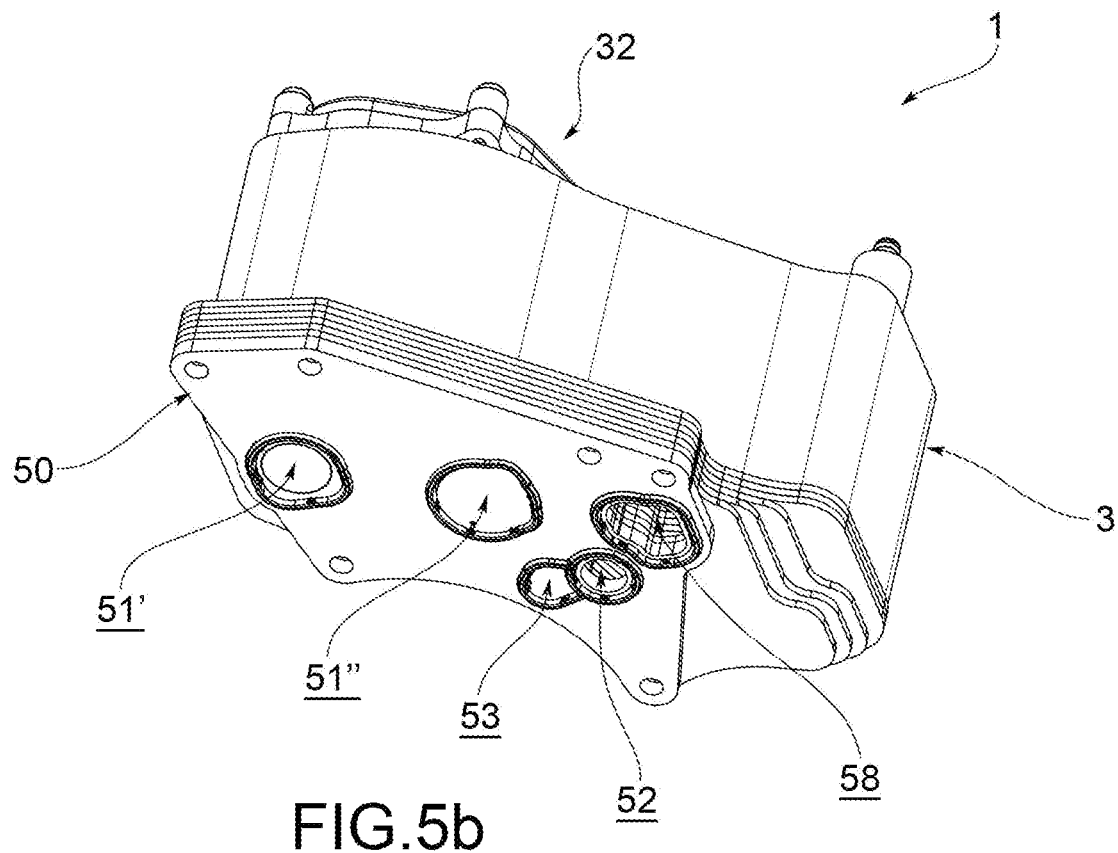
Figure 6:
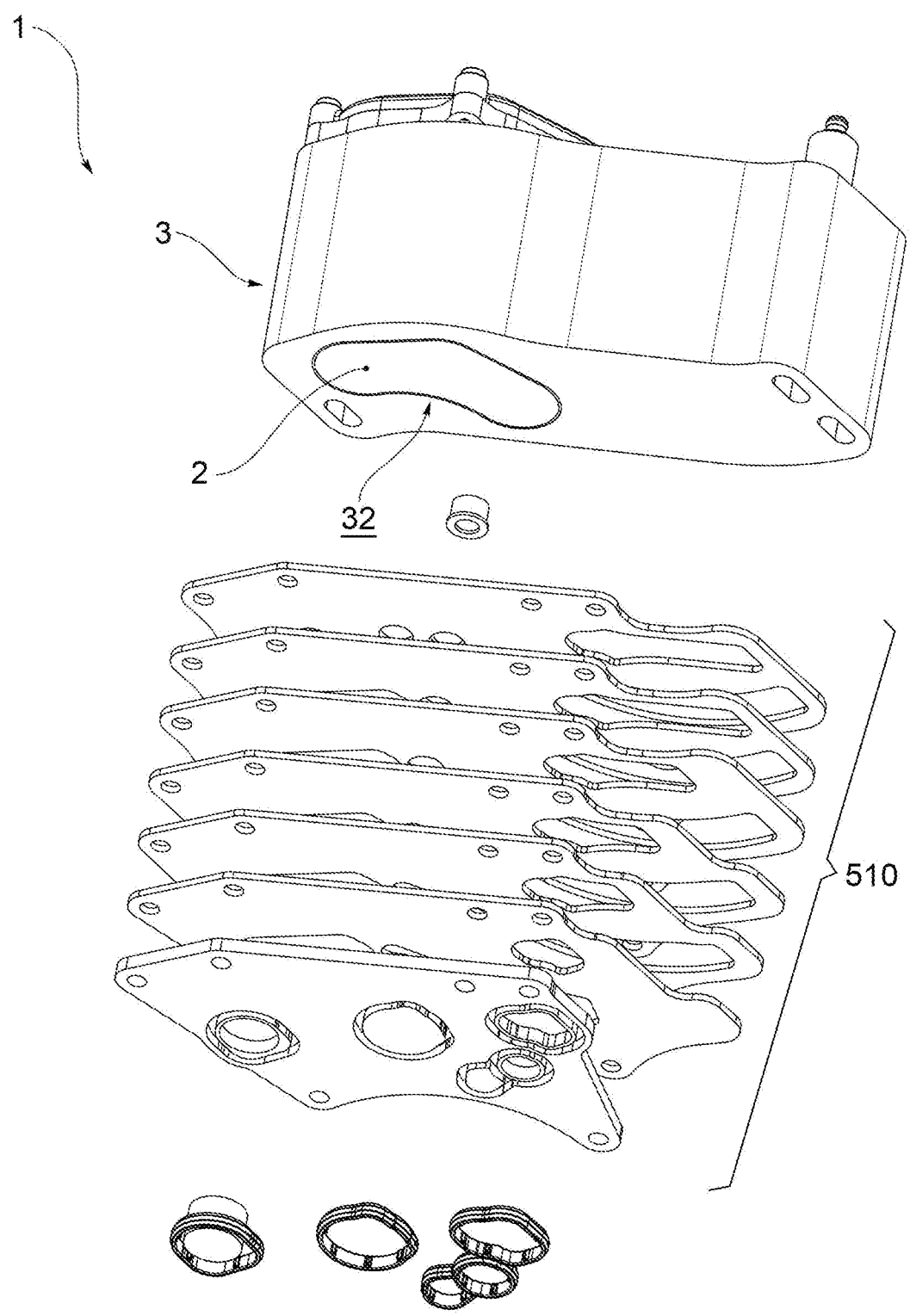
FIG. 6 shows a perspective view of separate parts of the engine oil filtration and temperature regulation assembly of FIGS. 5a and 5b.
Figure 7A:
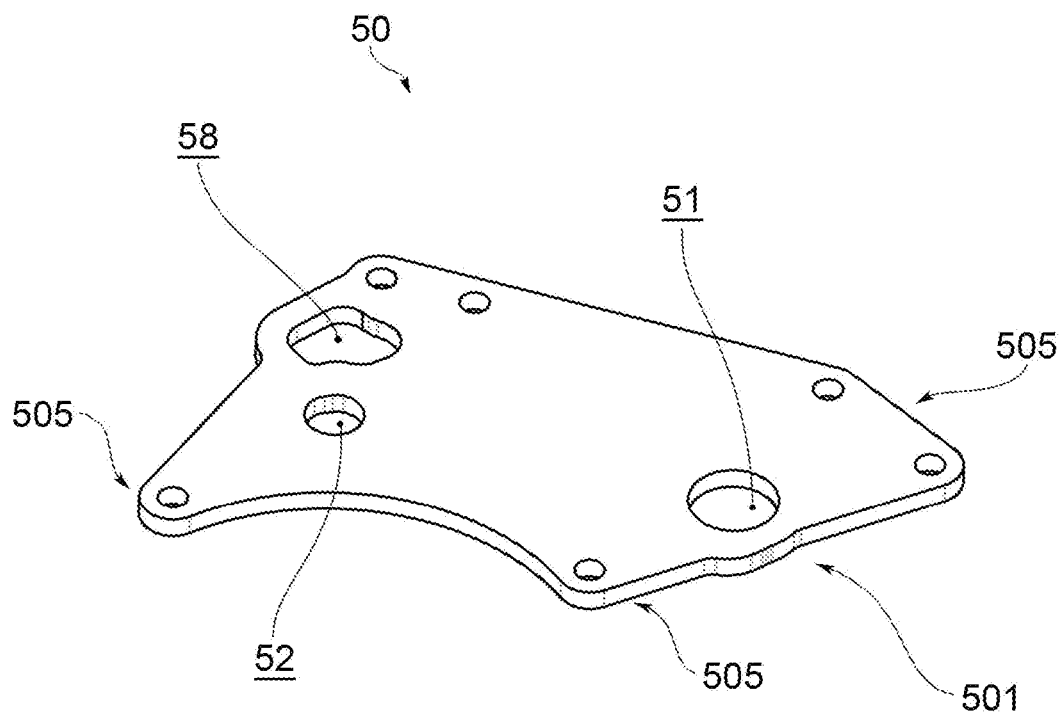
FIGS. 7a to 7g show some preferred assembly steps of a support and fluidic connection group comprised in the assembly of FIGS. 5a and 5b.
Figure 7B:
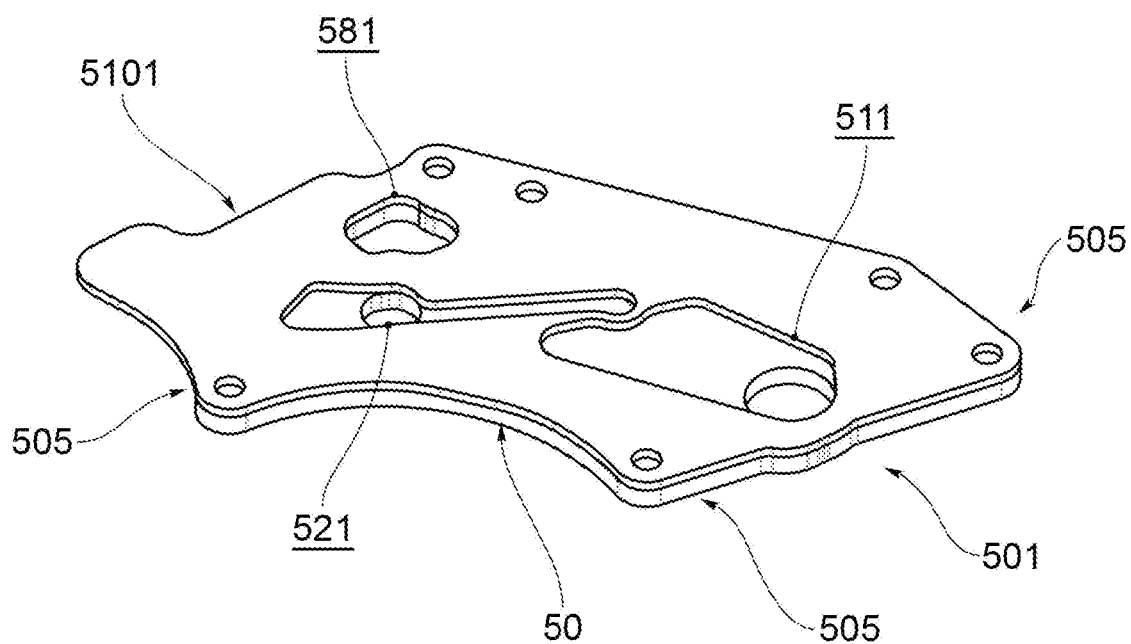
Figure 7C:
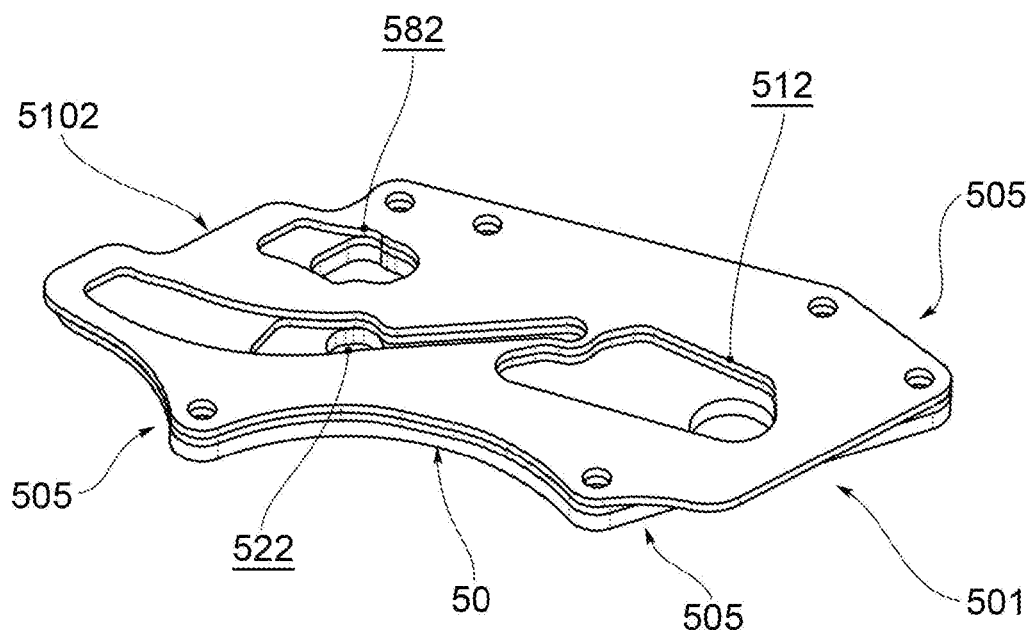
Figure 7D:
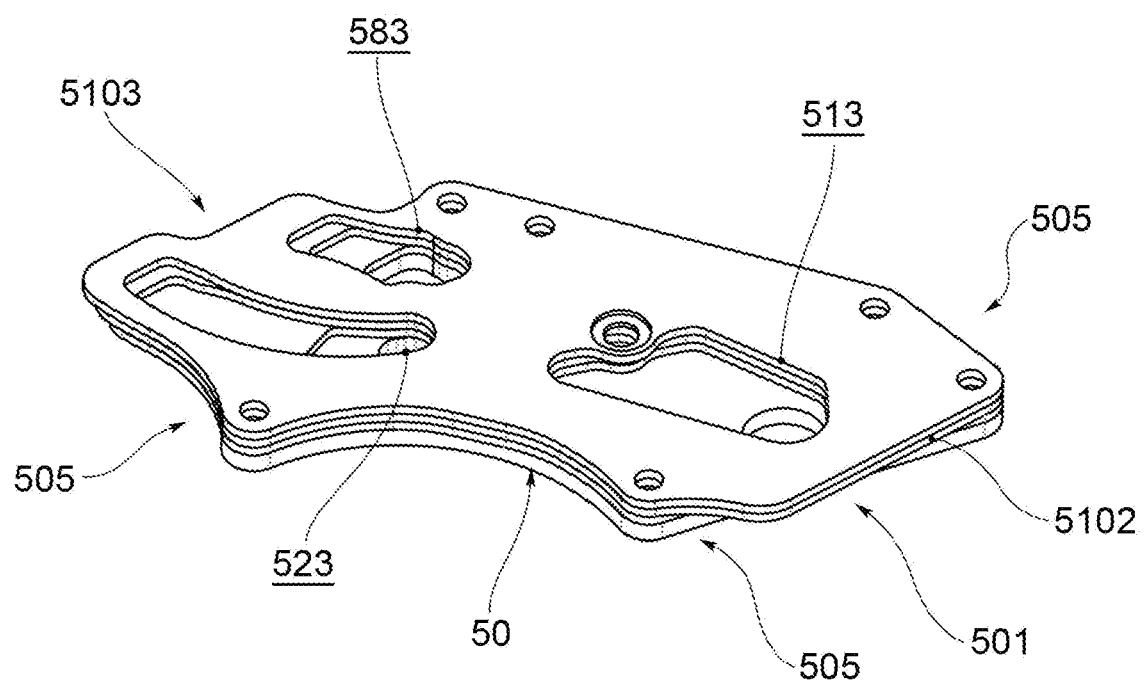
Figure 7E:
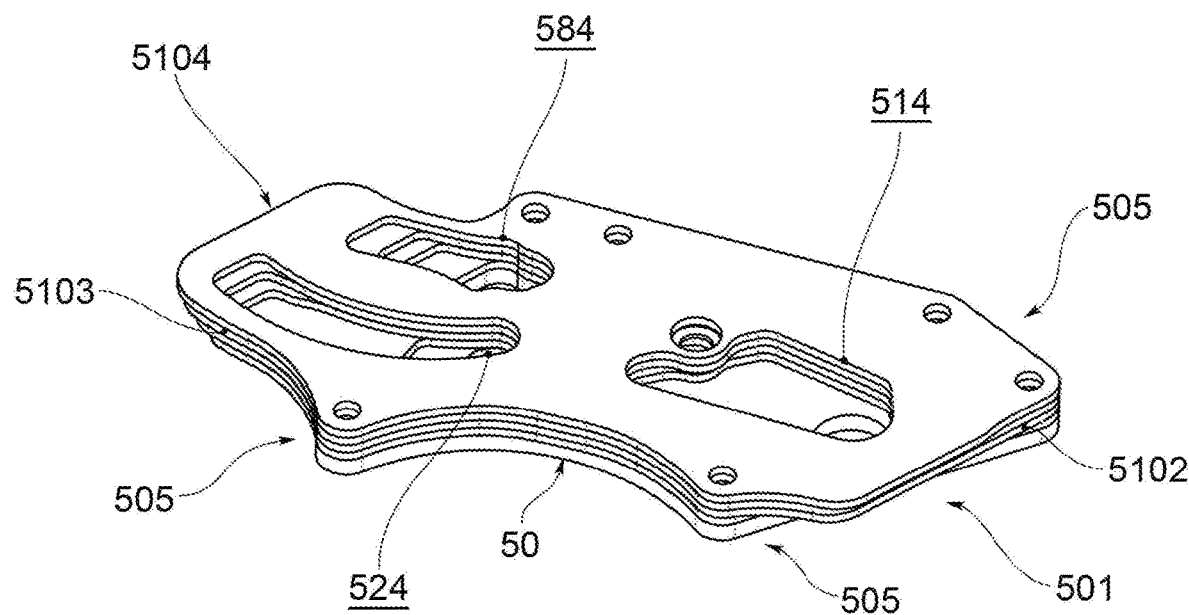
Figure 7F:
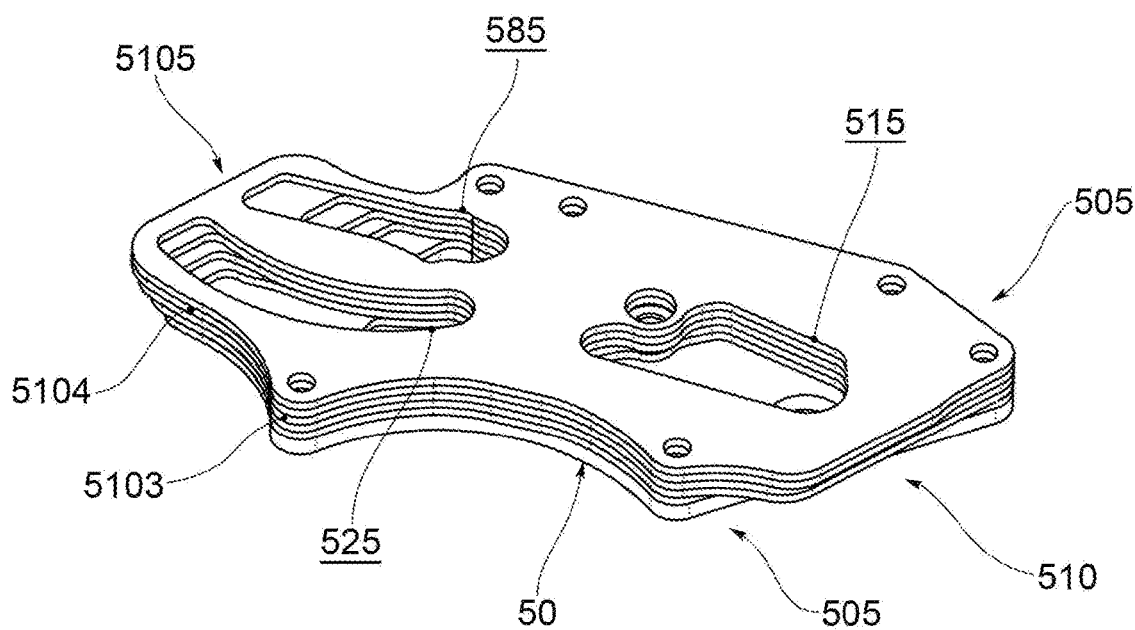
Figure 7G:
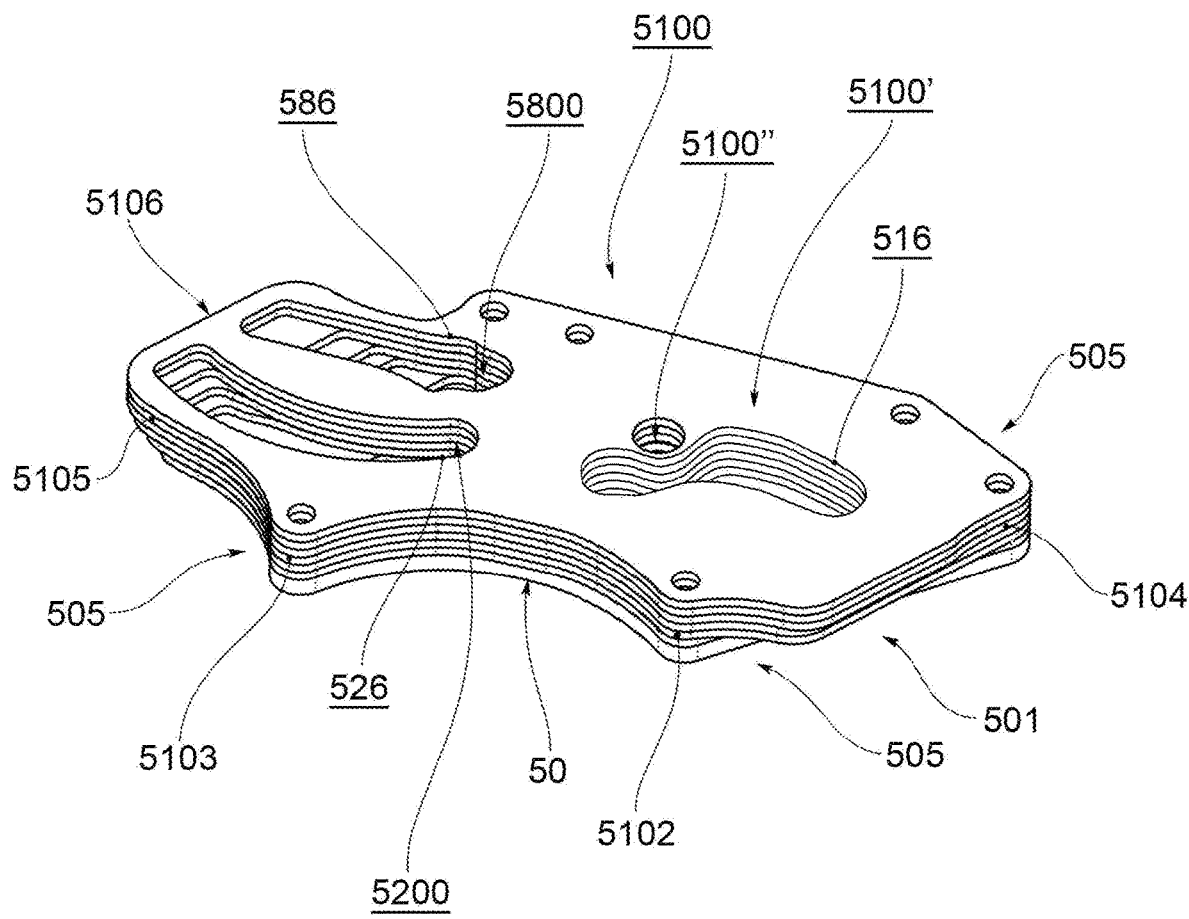

For example, a preferred embodiment with an exchanger group 3 with horizontal development is shown in FIGS. 5 to 7.

According to a preferred embodiment, the exchanger group 3 extends in such a way as to be supported cantilevered with respect to the base plate 50.

In other words, according to a preferred embodiment, the multi-layer assembly 510 has a shape variable in height. Namely, the multi-layer assembly 510 is designed to have a shape substantially different from that of the base plate 50 or of the shape of the heat exchanger 3.

For example, the multi-layer element 510 has the first plate-shaped element 5101 with a shape substantially similar to that of the base plate 50 and the last plate-shaped element 5106 having a shape of dimensions such as to present a support for the exchanger group 3 in its entirety.

Preferably, in this embodiment, the multi-layer assembly 510 has each plate-shaped element 5101, 5102, 5103, 5104, 5105, 5106 with a shape different from the adjacent one.

Preferably, in a preferred embodiment variant, the multi-layer assembly 510 has some plate-shaped elements 5101, 5102, 5103, 5104, 5105, 5106 of shape similar to the adjacent ones; for example, the multi-layer assembly 510 has pairs of plate-shaped elements 5101, 5102, 5103, 5104, 5105, 5106 with the same shape.

According to a preferred embodiment, the exchanger group 3 has an inlet and filtration chamber 32 in which is housed the filtration unit 2. In other words, in a preferred embodiment, the heat exchanger group 3 is suitable to house the oil filtration group 2.

According to a preferred embodiment, said solution with filtration group 2 housed in the exchanger group 3 is preferably provided in the embodiment in which the heat exchanger group 3 has a substantially horizontal development.

Preferably, therefore, the more overhanging is the heat exchanger group 3 (depending on the space in the engine compartment), the larger the plates that make it up (and the ducts obtained therein).

According to this embodiment, the engine oil filtration and temperature regulation assembly 1 is suitable to occupy the space in the engine compartment in horizontal, offering an efficient and more powerful heat exchanger group 3.

According to this embodiment, the engine oil filtration and temperature regulation assembly is suitable to occupy the space in the engine compartment in a direction substantially orthogonal to the direction normal to the base plate 50, offering an efficient and more powerful heat exchanger group 3.

According to the foregoing, according to a preferred embodiment, the support and fluidic connection device 500 presents the respective fluidic connection ducts 5100, 5100', 5100", 5200, 5300, 5800, obtained from the overlapping of the respective openings, present a section optimised to minimise losses of head. In other words, preferably, each opening on each plate-shaped element has shaped edges so that ducts are obtained in the packing of the plates having an optimised section in order to favour the flowing fluid, for example avoiding undesired corners or bottlenecks.

As for example shown in the accompanying figures, some of said ducts have a variable section, in some cases up to create filling tanks suitable to be filled with the respective fluid, oil and/or water, minimising load losses.

Depending on the needs and shapes of the ducts to be recreated, plate-shaped elements are preferably added. For example, in order to minimise pressure losses, 4, 5 or 6 plate-shaped elements are preferably connected to the base plate.

An object of the present invention is also an engine oil filtration and temperature regulation assembly, preferably having the features described above.

This method of production comprises the steps of providing an oil filtration group 2, providing a heat exchanger group 3, providing a fluidic connection and support group 5.

Preferably, the fluidic connection and support group 5, similar to what described above, is engageable to the engine and is suitable to support and fluidically connect the filtration group 2 and the heat exchanger group 3 to the engine.

According to a preferred embodiment, the support and fluidic connection group 5 is obtained by the steps of:

i) producing a base plate 50 having the features described above.

ii) producing a support and fluidic connection device 500, placed between the base plate 50 and filtration group 2 and/or heat exchanger group 3;

iii) joining the base plate 50 with the support and fluidic connection device 500.

According to the method object of the present invention, the support and fluidic connection group 500 is obtained by the steps of:

a) producing a plurality of plate-shaped elements 5101, 5102, 5103, 5104, 5105, 5106, wherein each plate-shaped element 5101, 5102, 5103, 5104, 5105, 5106 has a plurality of openings each defined by a respective opening edge;

b) composing a multi-layer assembly 510 constituted by the overlapping of the plurality of plate-shaped elements 5101, 5102, 5103, 5104, 5105, 5106 in such a way that said openings are overlapped and constitute respective ducts 5100, 5200, 5800.

Preferably, the fluidic connection and support group 500 also comprises the steps of:

c) producing a plurality of auxiliary plate-shaped elements 5202', 5202";

d) producing spacer elements 5201', 5201", preferably of tubular shape;

e) composing an auxiliary assembly 520, positionable between the multi-layer assembly 510 and the heat exchanger group 3, by overlapping the plurality of auxiliary plate-shaped elements 5202', 5202" and the spacer elements 5201', 5201";

f) mounting the auxiliary assembly 520 on the multi-layer assembly 510 in such a way as to overlap the spacer elements 5201', 5201" and the auxiliary plate-shaped elements 5202', 5202" by placing the respective openings in such a way as to fluidically connect the multi-layer assembly 510 and exchanger group 3 and/or the oil filtration group 2.

In addition, according to a preferred embodiment, the above steps of joining the base plate 50 with the fluidic connection and support device 500 are obtained by performing a brazing operation, preferably in autoclave.

Moreover, according to a preferred embodiment, the step may be provided in which the base plate 50, the support and fluidic connection device 500 and the heat exchanger 3 are joined through a single operation of brazing, preferably in an autoclave. In other words, in this embodiment, the base plate 50, the fluidic connection and support device 500 and the plates that make up the heat exchanger 3 are mutually joined in one operation.

In other words, according to a preferred embodiment, the fluidic support and connection group 5 having the above features is made of metal.

Preferably, each component of the fluidic connection and support group 5 described above is in a respective metal.

In a preferred embodiment, the plate-shaped elements comprised therein are in a metal, covered with a brazing alloy, which is a special metal that by melting allows the connection between the various components.

In a preferred embodiment, the plate-shaped elements are in an aluminium alloy or a steel alloy. Depending on the type of such materials, the brazing alloy is an alloy with a lower melting temperature.

Preferably, the various plate-shaped elements forming the multi-layer assembly and any auxiliary assembly components are provided in metal, obtained by moulding, shearing or laser cutting starting from a same sheet of metal and drawn, if required. Preferably, the various plate-shaped elements forming the multi-layer assembly and any auxiliary assembly components made of metal by cold deformation operations.

Innovatively, the engine oil filtration and temperature regulation assembly amply meets the object of the present invention overcoming the typical drawbacks of the prior art. Likewise, the production method of an engine oil filtration and temperature regulation assembly in turn fully meets the object of the present invention.

Advantageously, in fact, the engine oil filtration and temperature regulation assembly has an extreme flexibility both with regard the design modes thereof and the production modes thereof.

In addition, advantageously, the assembly is suitable to have a simple and effective support and fixing as well as a simple and effective fluidic connection between the engine and the support group and the filtration group.

A further advantageous aspect also lies in the simple implementation and versatility and flexibility of the fluidic connection; advantageously, embodiment variants can be contemplated and produced by producing dedicated plate-shaped elements, i.e. producing plate-shaped elements having openings specially shaped therein.

Advantageously, starting from the same engine, and thus from the same layout of its circuits, and starting from the same base plate engaged to the engine, using the fluidic connection and support device, heat exchangers are advantageously mountable which are more performing and more powerful, having a larger heat exchange surface than the typical solutions of the prior art. For example, advantageously, the same heat exchange power of a prior art solution is achieved, with a heat exchanger with vertical development, which due to its tilted position and thus to the possibility of having a larger heat exchange surface, has fewer plates and therefore has low height. Likewise, for example, advantageously, the same heat exchange power of a prior art solution is achieved, with a heat exchanger with horizontal development, which due to its overhanging position and thus to the possibility of having a larger heat exchange surface in addition to the base plate has fewer plates and low height.

In other words, advantageously, different embodiments of heat exchangers are connectable on the same engine.

Advantageously, the engine compartment and the spaces therein are fully exploitable vertically and/or horizontally, proposing respective solutions of oil filtration and temperature regulation assembly.

A still further advantage consists in the possibility to have a versatile method of production of the assembly, functionally adaptable to the different embodiments of the heat exchanger group.

Advantageously, embodiment variants of the engine oil filtration and temperature regulation assembly can be provided (both embodiments that provide the heat exchanger group with horizontal development and embodiments that provide the heat exchanger group with vertical development, and that provide an inclined position of the exchanger group) without changing the methods of design and production described, but only by providing specific shapes of the plate-shaped elements and special shapes of the openings therein.

Advantageously, the fluidic connection and support group is producible in a metallic material and the plate-shaped elements are packable by a brazing operation, overcoming the need for any gaskets between them. Advantageously, it is also contemplated the need to join, in addition to the respective components of the fluidic connection and support group, also the heat exchanger group with it, by the same single brazing operation.

It is clear that a man skilled in the art may make changes to the engine oil filtration and temperature regulation assembly and the method of producing an engine oil filtration and temperature regulation assembly described in order to meet incidental needs, all falling within the scope of protection defined in the following claims.

LIST OF REFERENCE NUMERALS

1 engine oil filtration and temperature regulation assembly
2 oil filtration group
3 heat exchanger group
32 inlet and filtration chamber
5 fluidic connection and support group
50 base body
501 central portion
505 fixing portion
51 oil inlet mouth
51' first oil inlet mouth
51" second oil inlet mouth
52 oil outlet mouth
53 oil drainage outlet mouth
58 water inlet mouth
500 support and connection group 510 multi-layer assembly
5101, 5102, 5103, 5104, 5105, 5106 plate-shaped elements
5100, 5100', 5100'', 5200, 5300, 5800 oil/water ducts
511, 511', 511'', 521, 531, 581 first plate opening
512, 512', 512'', 522, 532, 582 second plate opening
513, 513', 513'', 523, 533, 583 third plate opening
514, 514', 514'', 524, 534, 584 fourth plate opening
515, 515', 515'', 525, 535, 585 fifth plate opening
516, 516', 516'', 526, 536, 586 sixth plate opening
5104a, 5202a' flange plate-shaped elements
5102', 5102'', 5802 auxiliary ducts
520 auxiliary assembly
5201', 5201'' spacer elements
5202', 5202'' auxiliary plate-shaped elements

The invention claimed is:

1. An engine oil filtration and temperature regulation assembly mountable on a vehicle engine and fluidically connectable to an engine oil circulation system, the assembly comprising:
   a) an oil filtration group;
   b) a heat exchanger group;
   c) a fluidic connection and support group configured to be engaged to the engine, said fluidic connection and support group supporting the oil filtration group and the heat exchanger group, said fluidic connection and support group comprising:
      i) a base plate comprising at least one oil inlet mouth configured to be fluidically connected to receive oil from the engine and at least one oil outlet mouth configured to be fluidically connected to return filtered oil to the engine;
      ii) a support and fluidic connection device placed between the base plate and the oil filtration group and/or the heat exchanger group, the support and fluidic connection device comprising:
      a multi-layer assembly comprising a plurality of overlappable plate-shaped elements, wherein each plate-shaped element has a plurality of openings, each of the openings defined by a respective opening edge, such that said openings are overlappable and comprise respective ducts to create a fluidic connection between the engine and the oil filtration group and/or the heat exchanger group;
   wherein the heat exchanger group includes a heat exchanger inlet and a chamber, and wherein the oil filtration group is housed inside the chamber.

2. The engine oil filtration and temperature regulation assembly according to claim 1, wherein the assembly is fluidically connectable to a water circulation system of the engine, and wherein said base plate comprises at least one water inlet mouth configured to be fluidically connected to receive cooling liquid from the engine and said multi-layer assembly.

3. The engine oil filtration and temperature regulation assembly according to claim 1, wherein the overlappable openings respectively formed on each plate-shaped element are defined by edges having shapes that are different from one another.

4. The engine oil filtration and temperature regulation assembly according to claim 1, wherein the base plate comprises a first oil inlet mouth and a second oil inlet mouth, and wherein the support and fluidic connection device comprises a first oil connection duct where oil flows towards the heat exchanger group and a second oil connection duct where oil flows towards the oil filtration group bypassing the heat exchanger group.

5. The engine oil filtration and temperature regulation assembly according to claim 1, wherein the base plate comprises a single oil inlet mouth, and wherein the support and fluidic connection device comprises, formed in packing surfaces of the plate-shaped elements, a first oil connection duct where oil flows towards the heat exchanger group and a second oil duct where oil flows towards the oil filtration group bypassing the heat exchanger group.

6. The engine oil filtration and temperature regulation assembly according to claim 1, wherein the base plate comprises an oil drainage outlet mouth through which oil is drained from the heat exchanger group and/or the oil filtration group to the engine via a respective drainage duct.

7. The engine oil filtration and temperature regulation assembly according to claim 1, wherein the heat exchanger group has a vertical development and has sectional dimensions smaller than sectional dimensions of the base plate.

8. The engine oil filtration and temperature regulation assembly according to claim 7, wherein the multi-layer assembly has a shape that is substantially equal to a shape of the base plate.

9. An engine oil filtration and temperature regulation assembly mountable on a vehicle engine and fluidically connectable to an engine oil circulation system, the assembly comprising:
   a) an oil filtration group;
   b) a heat exchanger group;
   c) a fluidic connection and support group configured to be engaged to the engine, said fluidic connection and support group supporting the oil filtration group and the heat exchanger group, said fluidic connection and support group comprising:
      i) a base plate comprising at least one oil inlet mouth configured to be fluidically connected to receive oil from the engine and at least one oil outlet mouth configured to be fluidically connected to return filtered oil to the engine;
      ii) a support and fluidic connection device placed between the base plate and the oil filtration group and/or the heat exchanger group, the support and fluidic connection device comprising:
      a multi-layer assembly comprising a plurality of overlappable plate-shaped elements, wherein each plate-shaped element has a plurality of openings, each of the openings defined by a respective opening edge, such that said openings are overlappable and comprise respective ducts to create a fluidic connection between the engine and the oil filtration group and/or the heat exchanger group;
   wherein the heat exchanger group includes a heat exchanger inlet and a chamber, wherein the oil filtration group is housed outside the chamber,
   wherein the heat exchanger group has a vertical development and has sectional dimensions smaller than sectional dimensions of the base plate, and
   wherein the support and fluidic connection device further comprises an auxiliary assembly placed between the multi-layer assembly and the heat exchanger group to fluidically connect the multi-layer assembly and the heat exchanger group and form a filter connection region in which a portion of the oil filtration group is housed.

10. The engine oil filtration and temperature regulation assembly according to claim 9, wherein the auxiliary assembly comprises spacer elements operatively connected with the multi-layer assembly, and auxiliary plate-shaped elements overlappable and operatively connected to the heat exchanger group and/or the oil filtration group and to the spacer elements and with the multi-layer assembly, wherein the spacer elements and the auxiliary plate-shaped elements comprise a plurality of openings each defined by a respective opening edge, such that said openings are overlappable and comprise mutual coupling auxiliary ducts fluidically connected to the respective ducts of the multi-layer assembly for fluidic connection between the multi-layer assembly and the oil filtration group and/or the heat exchanger group.

11. The engine oil filtration and temperature regulation assembly according to claim 10, wherein the heat exchanger group, by the auxiliary assembly, is disposed in a position spaced and inclined with respect to the base plate and the multi-layer assembly.

12. The engine oil filtration and temperature regulation assembly according to claim 1, wherein the heat exchanger group has a horizontal development and has sectional dimensions larger than sectional dimensions of the base plate.

13. The engine oil filtration and temperature regulation assembly according to claim 9, wherein the auxiliary assembly supports the heat exchanger group such that the heat exchanger group is cantilevered with respect to the base plate.

14. The engine oil filtration and temperature regulation assembly according to claim 12, wherein the multi-layer assembly has a shape that is variable in height, wherein a first plate-shaped element of the plurality of plate-shaped elements has a shape that is substantially similar to a shape of the base plate, and a last plate-shaped element of the plurality of plate-shaped elements has a shape that is configured to provide support for the heat exchanger group.

15. The engine oil filtration and temperature regulation assembly according to claim 1, wherein the respective ducts of the support and fluidic connection device are obtained by overlapping the respective openings defined by respective opening edges.

16. A production method of an engine oil filtration and temperature regulation assembly mountable on a vehicle engine, the method comprising:
   providing an oil filtration group;
   providing a heat exchanger group;
   providing a support and fluidic connection group engageable to the engine, to support and fluidically connect the oil filtration group and the heat exchanger group to the engine, wherein the support and fluidic connection group is obtained by:
   i) producing a base plate, said base plate comprising at least one oil inlet mouth to be fluidically connected to receive oil from the engine and at least one oil outlet mouth to be fluidically connected to return filtered oil to the engine;
   ii) producing a support and fluidic connection device, placed between the base plate and the oil filtration group and/or heat exchanger group, by:
     a) producing a plurality of plate-shaped elements, wherein each plate-shaped element has a plurality of openings each defined by a respective opening edge;
     b) producing a multi-layer assembly comprising overlapping of the plurality of plate-shaped elements such that said openings are overlapped and comprise respective ducts;
     c) producing a plurality of auxiliary plate-shaped elements;
     d) producing spacer elements;
     e) producing an auxiliary assembly, configured to be positioned between the multi-layer assembly and the heat exchanger group; and
     f) mounting the auxiliary assembly on the multi-layer assembly to overlap the spacer elements and the auxiliary plate-shaped elements by placing respective openings to fluidically connect the multi-layer assembly and the heat exchanger group and/or the oil filtration group; and
   iii) joining the base plate with the support and fluidic connection device.

17. The production method of an engine oil filtration and temperature regulation assembly according to claim 16, wherein joining the base plate with the support and fluidic connection device is achieved through an operation of brazing.

18. The production method of an engine oil filtration and temperature regulation assembly according to claim 16, wherein joining the base plate with the support and fluidic connection device is achieved through a single operation of brazing.

* * * * *